( 12 ) United States Patent
Hostetter et al.

(10) Patent No.: US 9,916,310 B2
(45) Date of Patent: Mar. 13, 2018

(54) DATA STORAGE SYSTEM WITH FIXITY END-TO-END DATA PROTECTION DURING DATA ARCHIVING

(71) Applicant: ORACLE INTERNATIONAL CORPORATION, Redwood City, CA (US)

(72) Inventors: David G. Hostetter, Louisville, CO (US); David Allen Major, Broomfield, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 338 days.

(21) Appl. No.: 14/748,398

(22) Filed: Jun. 24, 2015

(65) Prior Publication Data

US 2016/0378772 A1    Dec. 29, 2016

(51) Int. Cl.
*G06F 17/30*    (2006.01)
(52) U.S. Cl.
CPC .. *G06F 17/30073* (2013.01); *G06F 17/30179* (2013.01)
(58) Field of Classification Search
CPC ......... G06F 17/30179; G06F 17/30076; G06F 17/30073
USPC ....................................... 707/667, 668, 661
See application file for complete search history.

(56) References Cited

U.S. PATENT DOCUMENTS

| 2003/0123175 | A1* | 7/2003 | Gill | ................... | G11B 5/584 360/53 |
| 2004/0243736 | A1* | 12/2004 | Hattrup | ............. | G06F 3/0605 710/15 |
| 2006/0130154 | A1* | 6/2006 | Lam | .................... | G06F 21/64 726/30 |
| 2007/0186127 | A1* | 8/2007 | Desai | ............... | G06F 11/1448 714/13 |

* cited by examiner

*Primary Examiner* — Rehana Perveen
*Assistant Examiner* — Loc Tran
(74) *Attorney, Agent, or Firm* — Marsh Fischmann & Breyfogle LLP; Kent A. Lembke; Bryan R. Rech

(57) ABSTRACT

A data storage system is provided that is configured to achieve end-to-end data protection. The system includes a server running a storage archive manager with a first fixity support module, and the system includes a tape drive running a second fixity support module. During operations, the storage archive manager reads a data file with associated fixity information from a disk storage device, and the storage archive manager builds a set of blocks from the data file for writing to the tape drive. The first fixity support module checks fixity of the set of blocks by processing the fixity information associated with the data file. The processing of the fixity information includes determining whether data in the set of blocks is out of order relative to data in the data file or whether data in the set of blocks is corrupt relative to the data in the data file.

6 Claims, 3 Drawing Sheets

DATA STORAGE SYSTEM WITH FIXITY END-TO-END DATA PROTECTION DURING DATA ARCHIVING

BACKGROUND

1. Field of the Invention

The present invention generally relates to data backup and data storage such as storage of data on tape drives and, more particularly, data storage systems adapted to provide efficient and high-quality data protection during the process of transferring data files from one storage device or system to another storage device or system (e.g., transferring data from disk storage to tape storage).

2. Relevant Background

For decades, magnetic tape data storage has offered cost and storage density advantages over many other data storage technologies including disk storage. A typical medium to large-sized data center will deploy both tape and disk storage to complement each other, with the tape storage often used for backup and archival data storage. Due to the increased need for securely storing data for long periods of time and due to the low cost of tape, it is likely that tape-based data storage will continue to be utilized and its use will only expand for the foreseeable future. Briefly, magnetic tape data storage uses digital recording on to magnetic tape to store digital information, and the tape is packaged in cartridges (i.e., the storage media or simply "media"). The device that performs writing and reading of data is a tape drive, and tape drives are often installed within robotic tape libraries, which may be quite large and hold thousands of cartridges to provide a tremendous amount of data storage (e.g., each tape may hold several terabytes of uncompressed data).

An ongoing challenge, though, for the data storage industry is how to provide data protection during the transfer of data (e.g., large data files) from disk storage (i.e., a first data storage device) to tape storage (i.e., a second data storage device). Specifically, it is important to verify that a file or object has not changed during the transfer processes. This fundamental goal of digital preservation can be attained by establishing and checking the "fixity" or stability of the digital content. Fixity is the property of a digital file or object being fixed or unchanged during the transfer processes such as during archiving processes from disk to tape storage, and it can be thought of as bit-level integrity of the data as fixity information offers evidence that one set of bits is identical to another (i.e., that the archived data matches the data on the first storage device).

Transferring data from one storage system to another is a potential point at which digital content can be damaged. It is, therefore, critical to check the fixity of the content whenever it is moved such as when it is archived from a user system to an archive data storage system. Some storage systems have been designed to have fixity built into the storage system so that data is regularly checked after transfer. For example, some data storage systems provide checksums on tape, such as per-block checksums. However, checking fixity of archived data has typically required that the data has to be read back from the tape drive (or tape library) to the host application, and such a read back operation can be very time consuming for large data archiving processes.

Hence, there remains a need for improved methods of checking fixity of transferred data (e.g., of archived data). Preferably, such methods could be built into the data storage system and would enhance transfer operations such as by reducing or even eliminating the need for reading back archived data to a host application. Avoidance of the read back operation is desirable because doing fixity checks increases the usage of the media and of the mechanical devices that read and handle the media, and, for some media, usage may be a factor contributing to the projected failure rate of the media (e.g., a tape cartridge). Further, performing a fixity check can slow other ongoing processes such as archiving or accessing archived data in a tape library or other data storage device, and, as a result, it is desirable to provide ways to check fixity that require less resources to complete.

SUMMARY

Briefly, a data storage system is provided that is adapted to implement a new method for fixity end-to-end protection during data transfer processes such as disk-to-tape archiving processes. The inventors recognized that there were problems with prior approaches to providing data protection during data archiving. Particularly, data storage customers want their data to be protected but without a performance penalty. However, the performance penalty can arise due to use of, and is determined by the strength of, a hashing algorithm to provide fixity information. Further, the performance penalty was created because the host application was forced to read back and compare the archived file for the final fixity check in prior storage systems. Reading back the archived file and then re-calculating the hash can be a very slow and resource-intensive process. The inventors understood that the storage industry needed a data protection solution that is effective in detecting data corruption, and, further, the inventors determined that it would be beneficial for the data storage system to be configured to also detect data records in the archived data that are out of order (when compared with the source data). With the data storage system described herein, both of these data protection functions are achieved without reading back the entire file from the archiving data storage device (e.g., from a tape drive or tape library).

More particularly, a data storage system is provided that is configured to achieve end-to-end data protection. The system includes a server with a processor running a storage archive manager with a first fixity support module, and the system also includes a tape drive for writing data to a magnetic storage tape, with the tape drive includes a processor running a second fixity support module. During operations of the system, the storage archive manager reads a data file with associated fixity information from a disk storage device (e.g., a file written by a user application to disk). Further, operations of the system include the storage archive manager building a set of blocks from the data file for transfer (or writing) to the tape drive. Still further, during operations, the first fixity support module checks fixity of the set of blocks by processing the fixity information associated with the data file. The processing of the fixity information associated with the data file by the first fixity support module includes determining whether data in the set of blocks is out of order relative to data in the data file and/or whether data in the set of blocks is corrupt relative to the data in the data file.

In some implementations, the first fixity support module generates an accumulated checksum or hash value based on checksum or hash values that are generated for each of the blocks in the set of blocks. In such implementations, the processing step includes comparing the accumulated checksum or hash value with the fixity information associated with the data file (e.g., an SHA-1 or SHA-256 checksum of the data file provided in its metadata).

In the same or other implementations, the first fixity support module generates a first accumulated checksum or hash value of check values associated with each of the blocks in the set of blocks. Then, during operations, the second fixity support module can generate a second accumulated checksum or hash value of check values associated with the blocks after transfer to the tape drive. The first fixity support module can then compare the first and second accumulated checksums or hash values of check values to determine whether after the transfer to the tape drive the blocks include corrupt data. While a range of check value types may be used as the fixity information provided for each block, the check values may each comprise a cycle redundancy check (CRC) value (e.g., a DIV CRC). Further, during system operations, the determination of whether the blocks include corrupt data is performed free of a read back of data in the blocks written to the magnetic storage tape to the storage archive manager (i.e., a host application such as the storage archive manager is not required to read back archived data from the tape drive in order to check fixity).

DETAILED DESCRIPTION

Briefly, the present description is directed toward a data storage system configured to provide fixity end-to-end data protection during data transfers between two data storage devices such as during disk-to-tape data archiving. The method of checking fixity implemented during operation of the data storage system ensures data protection without reading back a transferred file (e.g., an archived file). This can provide a major cost savings for a data storage system operator or customers of operators of a data storage system. Further, the data storage system will have greatly reduced wear and tear of the mechanical components and media, e.g., reduced wear of tape media and tape drive mechanics because the read-after-write-verify step is eliminated.

In some embodiments, the fixity checking method makes use of fixity information generated by a user application such as record checksums. The method may include, with the host application or a fixity support application run on the server/computer running the host application, accumulating those checksums over an entire file that is to be transferred (e.g., archived). Then, when the transfer (or archive) of the file is complete to a target data storage device (e.g., a tape drive), the method includes having the host application retrieving a final checksum from a fixity support application on the tape drive and then comparing it with the equivalent checksum determined by the host application. If the checksums (or other fixity information) matches then no read back of the transferred (or archived) data is required.

Figure 1:
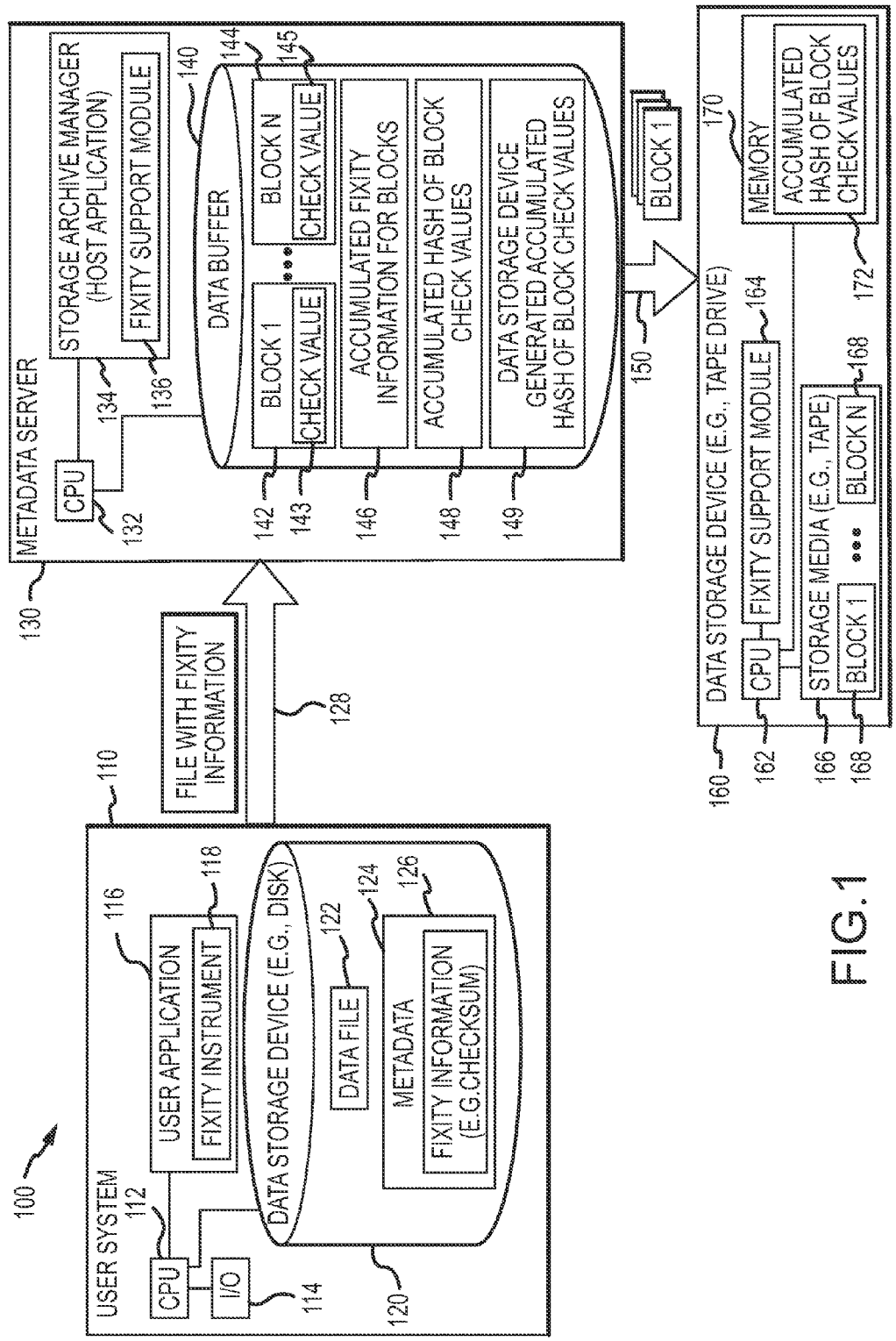
FIG. 1 is a functional block diagram of a data storage system (or network) configured for implementing a method of checking fixity in an end-to-end manner to provide more efficient data protection during archiving or other data transfer processes.

FIG. 1 is a functional block diagram of a data storage system (or network) 100 configured for implementing a method of checking fixity in an end-to-end manner to provide more efficient data protection during archiving or other data transfer processes between two data storage devices 120, 160 (e.g., between a disk device to a tape drive (or tape library)). As shown, the system 100 includes a user or client system 110, an intermediate system or server 130 shown as a metadata server, and a data storage device 160 (e.g., a target device for a data transfer that may take the form of a tape drive(s)). The user system 110 may be nearly any computer system such as a computer/server with a processor(s) 112, one or more input/output devices (such as monitor, a keyboard, a mouse, a touchscreen, and/or the like) 114 managed by the processor 112, and a data storage device 120 (e.g., a disk-based data storage device) also managed by or accessible by the processor 112.

The user system 110 includes a user application 116 (e.g., software/executable code run by processor 112 to perform a range of functions) that acts to create or write a data file 122 to memory or data storage device 120. The user application 116 is shown to include a fixity instrument 118 that acts to generate or calculate fixity information 126 for the data file 122 that is stored in metadata 124 associated with the data file 122. The fixity information 126 may take a wide variety of forms to practice the system 100 with one embodiment using a checksum or a hash function on the file 122 such as those generated with a MD-5, SHA-1, SHA-256, or other fixity instrument 118, e.g., one implementation of the system 100 may use fixity information in the form of a 256 bit checksum provided by a SHA-256 cryptographic hash function while others may use a 160-bit output hash value for fixity information 126 (e.g., when the instrument 118 uses or is a SHA-1 hash function). The choice of fixity information may involve a balancing of a desire for data security assurance with levels of effort or resource demands to generate the fixity information.

The data storage system 100 also includes an intermediate or metadata server 130 between the target storage device 160 for a data transfer and the user system 110 (i.e., the source storage device for the data transfer). The user application 116 may communicate a request for a data transfer to the metadata server 130 such as in the form of an archive request and then provide access to the data file 122 with fixity information 126 as shown at 128. In operation of the system 100, the server 130 includes a processor 132 running code/software to provide a host application (e.g., a storage archive manager) 134 that may read the data file 122. The metadata server 130 further includes memory or data storage as shown with data buffer 140. In many cases, the data file 122 may be divided into blocks to facilitate transfer to the data storage device 160 as shown at 150 such as when the target device 160 is a block level target and/or when the file 122 is larger than acceptable block sizes (e.g., a 6 megabyte (MB) file 122 may be broken up into three 2 MB blocks for transfer as shown at 150 to the data storage device 160).

During operation, the storage archive manager or host application 134 acts to read the file 122 and divide it into blocks 142, 144 (which may vary in size to suit the data storage device 160 or other operating parameters). A fixity support module 136 is provided (as part of the host application 134 or as an independent program) on the server 130 and generates a check value 143, 145 for each of the blocks 142, 144. For example, the fixity support module 136 may include cycle redundancy check (CRC) code (e.g., DIV CRC available from Oracle Corporation or the like) that generates the check value or CRC that is attached or appended to the blocks 142, 144 as shown at 143, 145.

Further, the fixity support module 136 acts to update an accumulated hash of the block check values 148 as each block is generated and written 150 to the data storage device 160. This accumulated hash 148 can then later be compared with a similar value generated by the data storage device as shown at 172 (and after retrieval by the storage archive manager 134 at 149) to provide a check on fixity of data transferred to the storage device 160 such as by identifying if the data was corrupted without a read back being required. Additionally, the fixity support module 136 acts to update accumulated fixity information 146 for the blocks 142 as these are generated and written 150 to the storage device. For example, the fixity support module 136 may create a checksum or perform a hash function on each block and then sequentially update the accumulated hash 146 (e.g., create a SHA-256 checksum for a next block 142, 144 and then add this to the previous SHA-256 checksum (or previous accumulated hash value)).

The system 100 further includes the data storage device 160, e.g., another disk device, a tape drive (or tape library), or the like. This device 160 includes a processor 162 that runs a second or additional fixity support module 164. The storage device 160 includes storage media such as disk(s) or tape when the device takes the form of a tape drive, and the blocks 142, 144 generated by the metadata server 130 are written to the media 166 as shown at 168. The fixity support module 164 acts during this process to calculate check values (e.g., CRCs such as a DIV CRC) for each block 168 and to generate an accumulated hash 172 from these check values that is stored in memory 170 for later retrieval/access by the storage archive manager 134 and its fixity support module 136.

As discussed below, after data transfer (e.g., archiving) is complete, the fixity support module 136 can act to determine if data became out of order or was corrupted during the transfer 128 between the data storage device (e.g., disk storage) 120 and the metadata server 130 by comparison of the fixity information 126 associated with the data file 122 and the accumulated fixity information 146 created by the fixity support module 136. The fixity support module 136 can also, without reading back the archived/transferred data 168 on the media 166, determine whether the transferred/archived data 168 is corrupt by comparing the accumulated hash of block check values 148 with a retrieved copy 149 of the data storage device-generated accumulated hash of block check values 172. In other words, the fixity support module 164 on the tape drive or other target storage device 160 performs similar steps as the fixity support module 136 on the server 130 on received/written blocks 168 to calculate check values (e.g., DIV CRCs, other CRCs, or the like) and to generate an accumulated hash of such check values, and these two accumulated hashes should match if there has been no change in the data during the transfer and writing processes between the server 130 and the data storage device 160. In this manner, end-to-end data protection is achieved without read back of the data 168 to the host application 134.

Figure 2:
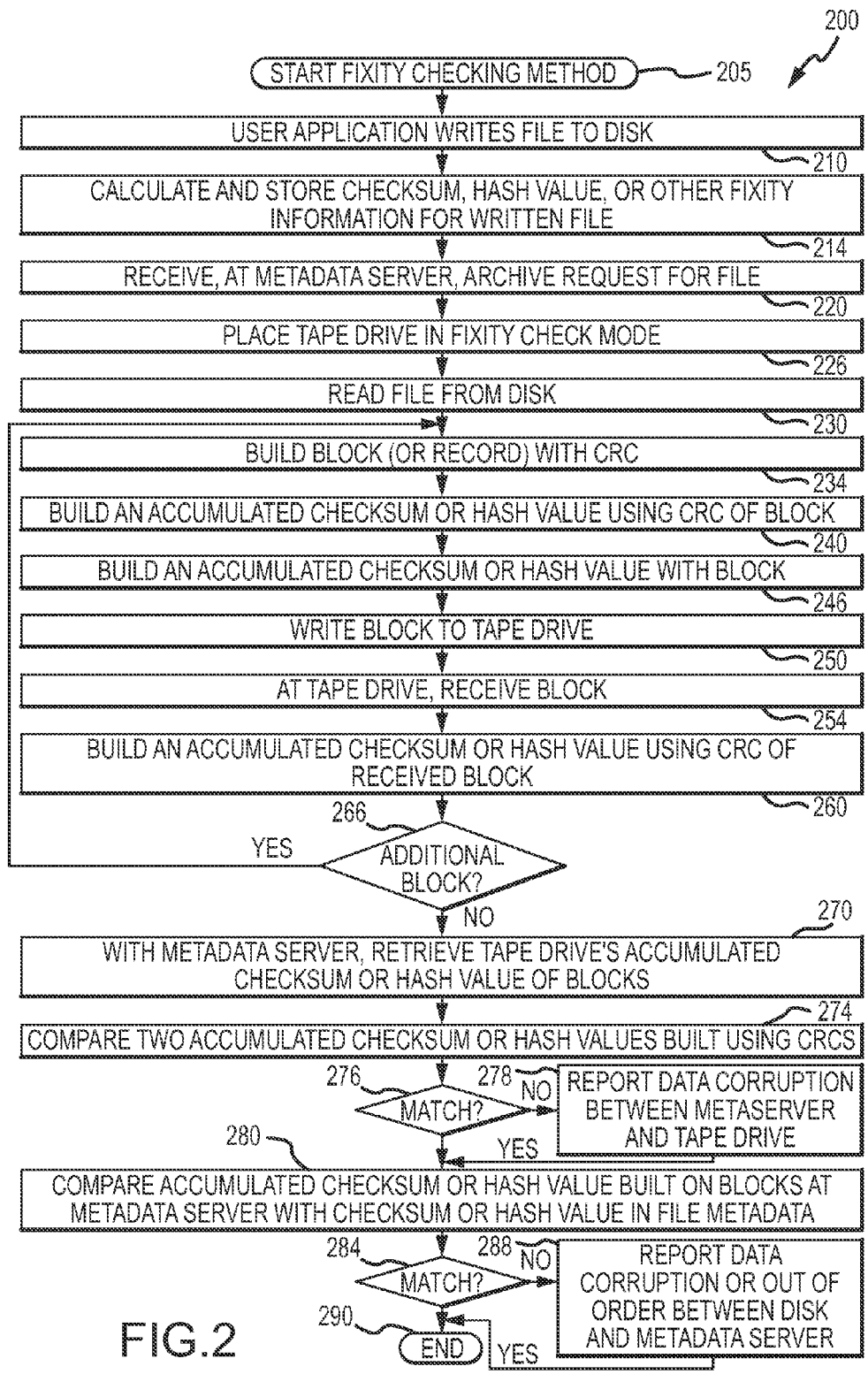
FIG. 2 is a flow diagram for a method of checking fixity of data archived from a disk storage device to a tape drive (e.g., end-to-end data protection) as may be implemented in a data storage system such as the system of FIG. 1.

FIG. 2 illustrates a method of checking fixity 200 that may be implemented in a data storage system such as system 100 when the first data storage device 120 provides disk storage and when the second data storage device 160 provides tape storage (e.g., is or includes a tape drive). The method 200 starts at 205 such as with providing a fixity support module on a metadata server running a storage archive manager or similar host application and also providing a fixity support module on a tape drive (or other target storage device for data archiving). The method 200 continues at 210 with a user application writing a file to disk (e.g., a 6 MB or other sized file to a disk drive). The user application (or other application on the user system) acts at 214 to calculate and store (e.g., in metadata associated with the file written in step 210) a checksum, hash value, or other fixity information for the file written in step 210. This may involve, for example, applying an SHA-256 algorithm to create a 256-bit checksum.

The method 200 continues at 220 with receiving, at the metadata or other server running a storage archive manager or other host application, an archive request for the file written in step 210 (such as from the user application). Then, at step 226, the storage archive manager acts to place a tape drive that includes a fixity support module (as described above with reference to FIG. 1) in a special mode (e.g., in a fixity check module) such that the tape drive (or its management software) acts to perform one or more of the steps of method 200 during archiving operations. At step 230, the method 200 includes reading the file identified in the archive request from disk, and this may include storing the file in a data buffer on or accessible by the metadata server.

The method 200 continues at 234 with building a first block (or record) from the read data file. For example, a large data file (e.g., one that is 4 to 10 MB or the like) may be divided into smaller blocks having a size suited for a target storage device (e.g., 2 MB blocks may be useful for writing to a tape drive and a 6 MB file would be divided into three 2 MB blocks). A check value such as a CRC (e.g., a DIV CRC) is generated for and, typically, attached to the block such as by the fixity support module of the metadata server and/or with hardware assistance.

The method 200 continues at 240 with building an accumulated checksum or hash value using the CRC of the block built in step 234. For example, the CRC may be a DIV CRC and a checksum of the DIV CRC generated for blocks in the method may be accumulated (e.g., generate SHA-256 checksums of each CRC or other check value attached to each block and add these together). Step 240 may be performed by a fixity support module running on the metadata server. At step 246, the method 200 continues with building an accumulated checksum or hash value on the block built in step 234, and this may involve the fixity support module on the metadata server creating a checksum (e.g., an SHA-256 checksum) over the block and adding this to the previous value of the accumulated checksum for the blocks.

The method 200 continues at 254 with the storage archive manager on the metadata server writing the block written in step 234 to the tape drive placed in a special mode in step 226. Then, in step 254, the tape drive receives the block and, with its fixity support module, builds an accumulated checksum or hash value by determining a CRC (e.g., a DIV CRC) for the received block and accumulating this with prior CRCs for other received blocks (if any). The method 200 continues at 266 with determining whether or not there are additional blocks to be built for the file read in step 230. If yes, steps 234 to 260 are repeated until the entire file read from disk in step 230 has been written to the tape drive (e.g., until the data transfer is complete or until archiving is complete). In one example, the file read from disk is 6 MB and each built block is 2 MB such that steps 234-260 are repeated three times to provide the accumulated checksums or hash values that can be used to check fixity from the disk to the tape drive.

Particularly, the method 200 continues with step 270 when there are no more blocks (or no more data to build into blocks) remaining to be written to the tape drive. In step 270, the metadata server (such as via the host application or fixity support module) acts to retrieve or access the tape drive-generated accumulated checksum or hash value for the blocks that it received and wrote to the tape drive. As will be appreciated, it is desirable that this checksum or hash value be generated or calculated in the same manner as that used by the fixity support module on the metadata server to allow ready comparison (e.g., step 260 performed by the fixity support module running on the tape drive running its special mode (or fixity check mode) is similar to step 240 performed by the fixity support module running on the metadata server).

At step 274, the method 200 involves the fixity support module on the metadata server comparing the two accumulated checksum or hash values that have been built using the CRCs of the blocks. At 276, it is determined whether this comparison of step 274 shows a match. If not, the method 200 continues at 278 with an identification that the data written to the tape drive has been corrupted. For example, the blocks were corrupted after being built by the storage archive manager of the metadata server in step 234 since the checksum or hash value of the check values (CRCs such as DIV CRCs) of the blocks is not identical between the metadata server and the tape drive. In step 278, the fixity support module on the metadata server may be adapted to generate and issue an alert and/or report that are transmitted to user/operators such as via the user application or a predefined contact for such alerts/reports of identified data corruption between the metadata server and the tape drive.

The method 200 continues at 280 with the fixity support module on the metadata server acting to compare the accumulated checksum or hash value built over the blocks at the metadata server with the corresponding checksum or hash value provided in the data file's metadata from the user application or with the file to be transferred/archived. If a match is found at step 284, there is no data corruption and also the data is in the same order (i.e., data in blocks built by storage archive manager is not out of order with reference to the data file received from the user application (or first data storage device such as a disk storage device)). Hence, this comparison in steps 280, 284 acts to determine if there is data corruption or data out of order before the blocks were built by the storage archive manager on the metadata server. Also, this check of fixity data, which may vary in form to practice the method 200 but should match between the user application and its fixity instrument and the fixity support module's functioning in step 246, identifies whether data got out of order after the record was built by the storage archive manager (e.g., may have been in order when received by the metadata server but reordered during block building operations).

If out of order or corrupted as determined at 284, the method 200 continues at 288 with identifying that the data is out of order or corrupted and an alert and/or report is generated by the fixity support module. This alert and/or report can be transmitted to user/operators of the data storage system and/or the user server/user application that requested the archiving (or other data transfer operation). If a match is identified at 284, the method 200 may end at 290. Step 290 may include the storage archive manager on the metadata server acting to clear the special mode of operations at the target tape drive(s). Archiving is complete, and no recall or reading back of the archived data file is required to further verify fixity. The method 200 provides end-to-end data protection by checking fixity between the source data storage device (e.g., disk device to which a file was written by a user application) and the metadata server (or other intermediate computing device) running the storage archive manager (or other data transfer software/programs) and also between the metadata server and the tape drive (or other target data storage device for an archiving or other data transfer process).

Figure 3:
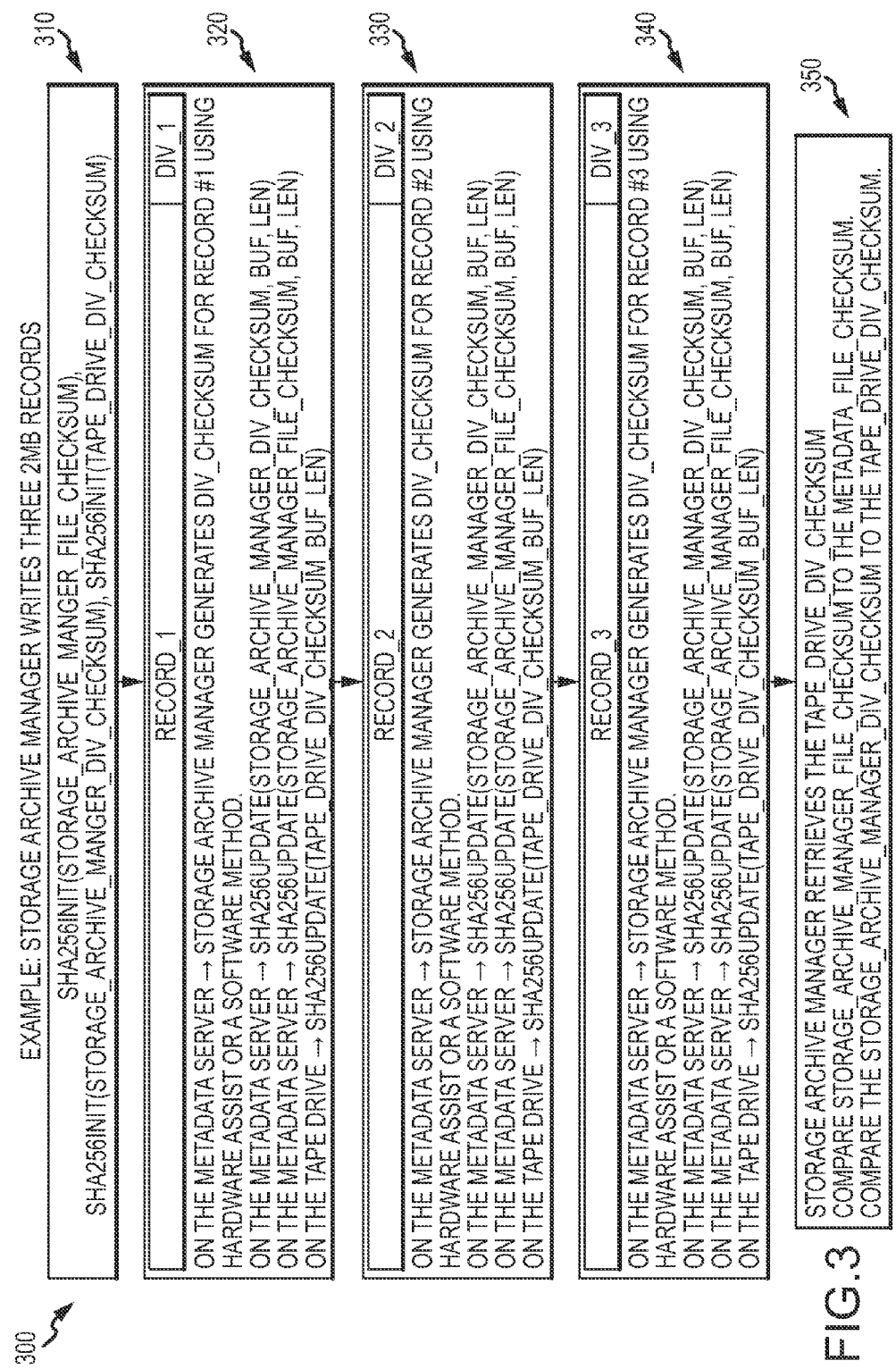
FIG. 3 is a flow diagram showing, with pseudo code, steps or sets of steps performed during an end-to-end fixity checking process according to the present description (e.g., as may be performed by the system of FIG. 1 to archive a data file to a tape drive).

FIG. 3 illustrates a flow diagram, with steps including pseudo code, of a method 300 of checking fixity of data in an end-to-end manner. In this example, a storage archive manager or other host application running on a metadata or intermediate server positioned between a user system/storage device and a target storage device is used to write a larger user file (e.g., one that is 6 MB in size) from disk to a tape drive. Fixity is checked both between the first data storage device and metadata server and between the metadata server and the tape drive (or "end-to-end" for an archiving process).

After a user application writes a file (e.g., a 6 MB file) to disk and issues an archive request for the file and after a tape drive is placed in special mode (fixity check mode), the method 300 starts at step 310 with initiating fixity information or values used to check fixity. In this example, the fixity information/values include: (1) a file checksum that will be generated (such as with a fixity instrument implementing the SHA-256 cryptographic hash function or other fixity instrument matching that implemented by user application to provide fixity information on the source data file) by the fixity support module of (or called by) the storage archive manager over the blocks it generates to provide a comparable value to the fixity information provided with the data file from the first/source data storage device; (2) a hash value or checksum (e.g., an output of a SHA-256 hash function) of check values (e.g., a CRC value such as a DIV CRC) for the blocks built from the data file received at the metadata server; and (3) a hash value or checksum (e.g., an output of a fixity instrument matching that of the metadata server) of check values (e.g., a CRC or other value as used by the metadata server) for the blocks received for writing at the tape drive.

The method 300 continues at 320 with the metadata server building a first record (or block) from the received data file, and this involves generating and attaching a check value (shown as "DIV_1" in FIG. 3 to represent a DIV CRC). Step 320 includes, on the metadata server, generating a checksum for this first record using hardware assist or a software method (e.g., run or called by the host application to generate the checksum). Then, step 320 includes on the metadata server updating both the accumulated checksum of the block check values (e.g., of the accumulated "DIV_1" values) and also the accumulated checksum of the block checksums. Both of these values may have been initiated to zero, and in step 320 will be equal to the values generated for the first record or block. Step 320 then includes on the tape drive (which has received the block for writing) updating the accumulated checksum of the block check values (e.g., the accumulated "DIV_1" values generated and attached for the blocks received for writing).

The method 300 then continues at steps 330 and 340 with performing these same processes on the additional records (shown as Record 2 and 3, which may also be 2 MB records if the input file was 6 MB and the tape drive is expecting such records). In this manner, the checksums (or hash values) for the block check values (e.g., DIV_1 values which may be CRCs or the like) and for the blocks are accumulated for use in fixity checking between each pair of the three devices used to archive the data file (e.g., the user application/disk storage, the metadata server, and the tape drive).

Then, the method 300 continues at 350 with the storage archive manager (or host application) on the metadata server retrieving the checksum of block check values that was generated by the tape drive for the blocks it received for writing. Step 350 then includes comparing the accumulated checksum generated by the metadata server over the blocks it has built with the accumulated checksum received in the metadata associated with the file received for archiving. This comparison is useful for identifying data corruption and out of order data that may occur during data transfer between the disk device and the metadata server or during block building by the storage archive manager. Step 350 also includes comparing the accumulated checksum generated by the metadata server over the check values (CRCs or the like) generated for each block with the accumulated checksum generated by the tape drive over the check values (CRCs or the like) generated for each block received by the tape drive for writing to tape. This comparison provides a way to determine whether data was corrupted after the blocks were built by the metadata server. These determinations are made without requiring a read back of the data from the tape drive to the storage archive manager.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products. The above described embodiments including the preferred embodiment and the best mode of the invention known to the inventor at the time of filing are given by illustrative examples only.

We claim:

1. A system for providing end-to-end data protection during archiving, comprising: a disk storage device storing a data file and fixity information for the data file; a metadata server providing a first fixity support module; and a tape drive providing a second fixity support module, wherein the metadata server reads the data file, builds a set of blocks from the data file, and generates fixity information for the blocks with the first fixity support module; wherein the tape drive receives the blocks for writing to tape media and, during the writing to the tape media, generates fixity information for the received blocks with the second fixity support module; wherein the first fixity support module checks fixity between the disk storage device and the metadata server by comparing the fixity information for the data file with the fixity information generated at the metadata server for the blocks; wherein the first fixity support module checks fixity between the metadata server and the tape drive, without reading back the data file from the tape drive, by comparing the fixity information generated at the metadata server for the blocks with the fixity information generated at the tape drive for the received blocks; wherein the fixity information for the data file comprises a checksum or hash value and the fixity information generated at the metadata server for the blocks comprises an accumulated checksum or hash value calculated by accumulating checksums or hash values generated by the first fixity support module for each of the blocks.

2. The system of claim 1, wherein the checksums or hash values comprise SHA-1 or SHA-256 checksums or hash values.

3. The system of claim 1, wherein the first fixity support module determines data is out of order, data is corrupt, or fixity is maintained based on the comparing of the fixity information for the data file with the fixity information generated at the metadata server for the blocks.

4. The system of claim 1, wherein the fixity information generated at the metadata server for the blocks comprises an accumulated checksum or hash value calculated by accumulating check values generated for each of the blocks and wherein the fixity information generated at the tape drive for the received blocks comprises an accumulated checksum or hash value calculated by accumulating check values generated at the tape drive for each of the received blocks.

5. The system of claim 4, wherein the check values each comprise a CRC.

6. The system of claim 4, wherein the first fixity support module determines data is corrupt or fixity is maintained based on the comparing of the fixity information generated at the metadata server for the blocks with the fixity information generated at the tape drive for the received blocks.

* * * * *